United States Patent [19]

Timothy et al.

[11] Patent Number: 5,775,726
[45] Date of Patent: Jul. 7, 1998

[54] ROOF-MOUNTED AIR BAG

[75] Inventors: Calvin M. Timothy, Brigham City; Mark W. Osmond, Perry; Jonathan A. Mitchell, Brigham City, all of Utah

[73] Assignee: Morton International, Inc., Chicago, Ill.

[21] Appl. No.: 655,105

[22] Filed: May 29, 1996

[51] Int. Cl.$^6$ .................................................. B60R 21/22
[52] U.S. Cl. ...................... 280/730.1; 280/735; 280/756
[58] Field of Search .............................. 280/730.1, 735, 280/756; 296/211, 214

[56] References Cited

U.S. PATENT DOCUMENTS

| | | | |
|---|---|---|---|
| 2,834,606 | 5/1958 | Bertrand | 280/730.1 |
| 3,733,088 | 5/1973 | Stephenson | 280/730.1 |
| 3,774,936 | 11/1973 | Barnett et al. | 280/730.1 |
| 3,815,307 | 6/1974 | Tantlinger | 296/211 |
| 4,536,008 | 8/1985 | Brown, Jr. | 280/730.1 |
| 5,230,531 | 7/1993 | Hamilton et al. | 280/737 |
| 5,273,309 | 12/1993 | Lau et al. | 280/730.2 |
| 5,312,131 | 5/1994 | Kitagawa et al. | 280/753 |
| 5,470,103 | 11/1995 | Vaillancourt et al. | 280/730.1 |
| 5,626,361 | 5/1997 | Heiner | 280/756 |

*Primary Examiner*—Eric D. Culbreth
*Attorney, Agent, or Firm*—Roger J. French; Gerald K. White

[57] ABSTRACT

A passive vehicle occupant restraint system is provided for an automotive vehicle having a front seat including a seat back defining generally a front passenger area to one side thereof and a rear passenger area to the other side thereof, and a roof having an outer roof surface, a quantity of insulation material inside of the outer roof surface and a headliner beneath and overlying the insulation material. The restraint system includes a first inflatable cushion mounted between the insulation material and the headliner and overlying at least a portion of the front passenger area of the vehicle, and an inflator operatively connected with the inflatable cushion and responsive to a predetermined triggering signal for producing a quantity of inflating gas for inflating the cushion.

15 Claims, 1 Drawing Sheet

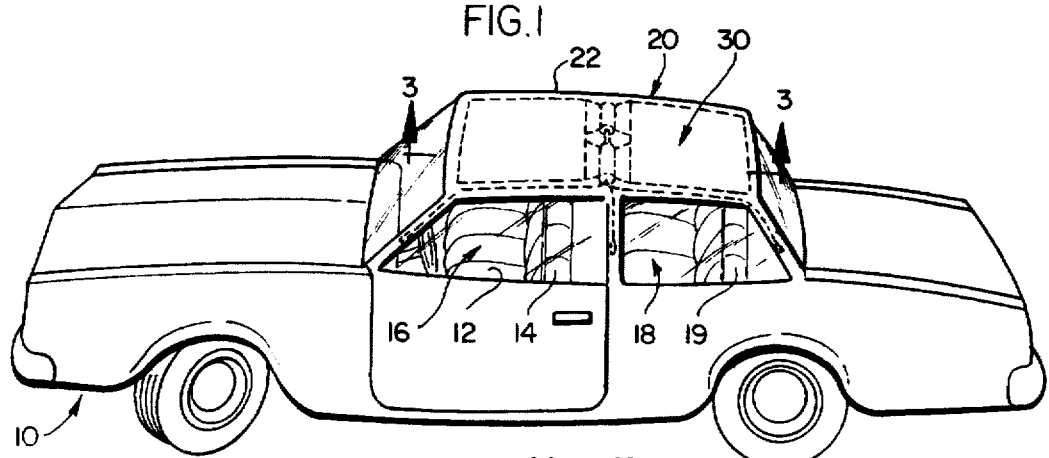
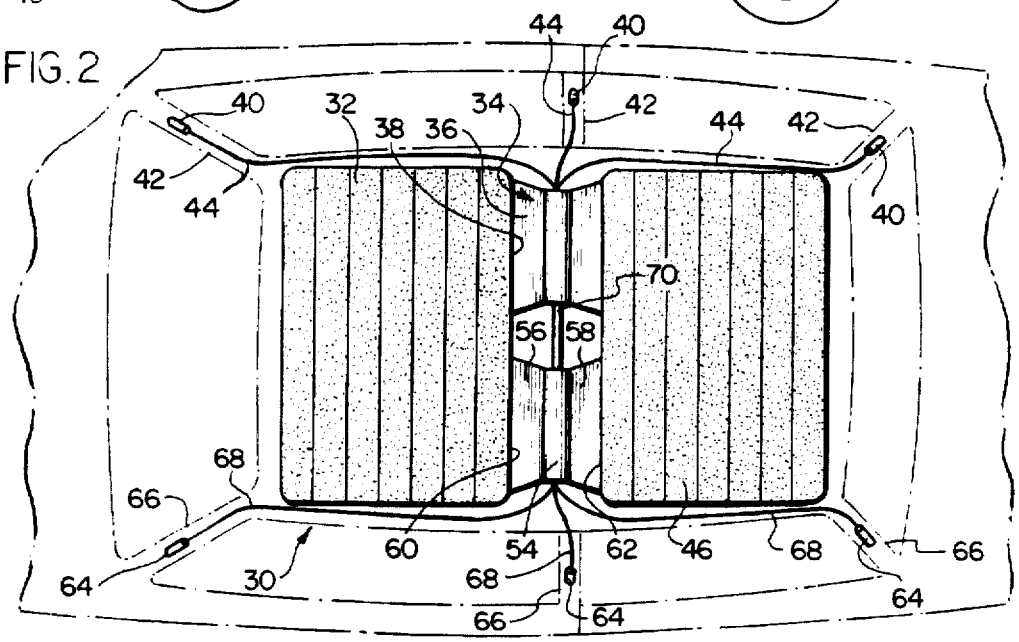
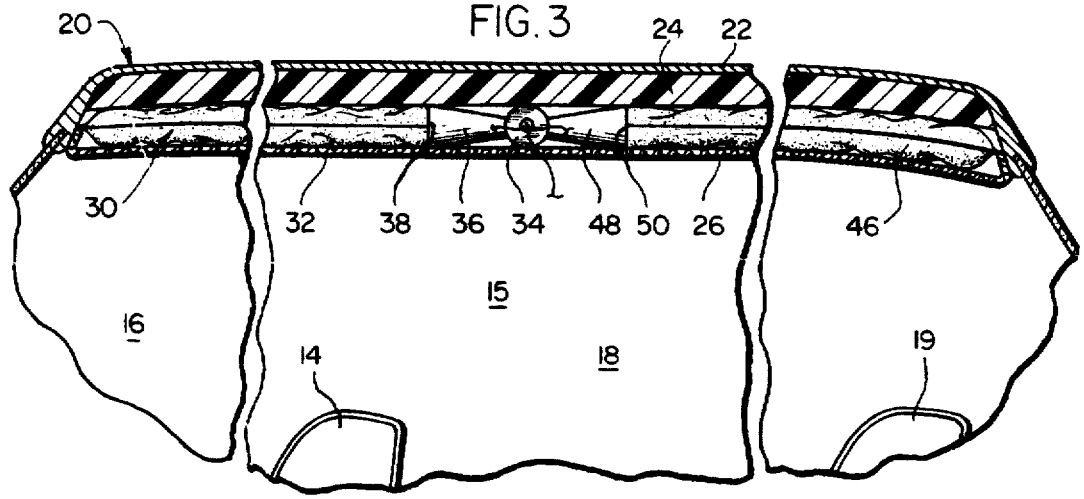

ROOF-MOUNTED AIR BAG

BACKGROUND OF THE INVENTION

The present invention relates in general to passive occupant restraint systems for use in automotive vehicles for restraining the movement of a seated occupant during a collision or other vehicle impact. In particular, the invention relates to an improved vehicle occupant passive restraint system which deploys one or more inflatable cushions in the roof area of the vehicle to protect the vehicle occupant in the event of impact such as roll over in the roof area of the vehicle.

Passive vehicle occupant restraint systems employing inflatable cushions or air bags are well-known in the art. Such systems have been used with increasing frequency in automotive vehicles. Generally speaking, in such systems one or more air bags or inflatable cushions are stored in a folded or deflated condition in storage areas within the passenger compartment of the vehicle. Upon a predefined impact on the vehicle, the air bags are rapidly filled with a suitable gas, whereupon they are inflated and deployed into the vehicle passenger compartment.

Usually, this deployment is effected by inflating the air bags or cushions using gases generated by, or released from, an inflator module or unit. In its inflated condition, the air bag acts to cushion the vehicle occupant against impact with interior vehicle surfaces, at least momentarily and temporarily restraining the vehicle occupant during critical moments of a collision or other impact.

Heretofore, such air bags or inflatable cushions have been most frequently provided in the front dashboard area of the vehicle for inflating more or less directly in front of the front seat occupants of the vehicle. Generally, one such air bag is utilized on the driver side and mounted in the steering wheel assembly, while another is mounted in the dashboard and located on the passenger side of the front seating area of the vehicle. In some vehicles, side-mounted air bags have also been utilized. These side-mounted air bags are usually mounted within the front door areas of the vehicle and inflate generally to the driver door side and passenger door side, respectively, for intervening between the driver and the driver side door and between the passenger and the passenger side door, respectively. These side-mounted air bags may be arranged so as to deploy only in the event of side impact on the vehicle.

While such front and side mounted air bags have proven useful in operation, there is room for further improvement. For example, such front and side mounted air bags are not specifically designed to provide cushioning between the head of an occupant and the roof of the vehicle in the event of an impact directed at the roof, such as in a vehicle roll-over situation.

OBJECTS AND SUMMARY OF THE INVENTION

Accordingly, it is a general object of the invention to provide a novel and improved roof-mounted passive vehicle occupant restraint system.

A more specific object is to provide such a passive restraint system which intervenes between a vehicle occupant and the roof of the vehicle in the event of roof impact, such as during a vehicle roll over situation.

A related object is to provide a passive vehicle occupant restraint system in accordance with the foregoing objects which is operative to intervene between vehicle occupants and the vehicle roof for both front seat and rear seat occupants of a vehicle.

Briefly, and in accordance with the foregoing objects, a passive vehicle occupant restraint system is provided for an automotive vehicle having a front seat including a seat back defining generally a front passenger area to one side thereof and a rear passenger area to the other side thereof, and a roof comprising an outer roof surface, a quantity of insulation material inside of said outer roof surface and a headliner beneath and overlying said insulation material. The restraint system comprises a first inflatable cushion mounted between said quantity of insulation material and said headliner and overlying at least a portion of the front passenger area of said vehicle, and an inflator operatively connected with said inflatable cushion responsive to a predetermined triggering signal for producing a quantity of inflating gas for inflating said cushion in.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a perspective view of an automotive vehicle employing a passive vehicle occupant restraint system in accordance with the present invention;

FIG. 2 is a top plan view of the passive vehicle occupant restraint system of FIG. 1; and FIG. 3 is an enlarged sectional view, partially broken away, and taken generally along the line 3—3 of FIG. 1.

DETAILED DESCRIPTION OF THE ILLUSTRATED EMBODIMENT

Referring to the drawings, and initially to FIG. 1, there is illustrated an automotive vehicle or automobile 10 in connection with which the invention may advantageously be employed. In the illustrated embodiment, the automotive vehicle 10 has a front seat 12 including a seat back 14 located in a passenger compartment 15. This front seat back 14 generally defines a front passenger area 16 to its one side and a rear passenger area 18 to its other side. A rear seat 19 is located in the rear passenger area 18 of the passenger compartment 15. The vehicle roof 20 includes an outer roof surface 22, typically of metal.

Referring also to FIG. 3, the vehicle roof 20 also includes a quantity or layer of insulation material 24 beneath the outer roof surface 22, which may serve as thermal and sound insulation for the vehicle 10. The roof 20 of the vehicle further includes a headliner 26 which overlies or covers the insulation material 24 at its side opposite the outer roof surface 22. This headliner material may be constructed of various fabrics or fabric-like materials, which may be selected for durability and also appearance, since the headliner 26 is visible in the passenger compartment 15 of the vehicle 10.

In accordance with the invention, a roof-mounted passive vehicle occupant restraint system, designated generally by the reference numeral 30, is provided mounted in the roof portion 20 of the vehicle 10. In the illustrated embodiment, this restraint system 30 comprises a first inflatable cushion 32 which is mounted between the insulation material 24 and the headliner 26 and generally overlies at least a portion of the front passenger area 16 of the vehicle 10. An inflator 34 is operatively connected with the inflatable cushion 32 for producing a quantity of inflating gas in response to a predetermined triggering signal. Generally speaking, the inflator 34 may be coupled by an outlet conduit or vent portion 36 to a complementary dimensioned inlet opening portion 38 of the cushion 32 so as to deliver a quantity of gas for inflating the cushion upon a predetermined triggering signal, which may occur, for example, upon an impact in the roof area of the vehicle, such as during a vehicle roll-over.

The triggering signal for triggering the inflator 34 may be produced by one or more impact sensors 40 which are mounted, in the illustrated embodiment, to respective roof pillars 42 of the vehicle and are operatively coupled, for example, by lead wires or cables 44, to the inflator 34. In the illustrated embodiment, three such impact sensors 40 are illustrated on the passenger side of the vehicle 10, it being understood that fewer or more such sensors might be utilized, and might be otherwise disposed, relative to the vehicle, without departing from the invention.

In the illustrated embodiment, a second similar inflatable cushion 46 is also mounted between the insulation 24 and the headliner 26 and is positioned overlying at least a portion of the rear passenger area 18 of the vehicle 10. As shown in FIG. 2, the respective inflatable cushions 32 and 46 each takes up a major part of the roof area above its associated one of the front and rear passenger areas 16 and 18, respectively.

The inflator 34 will be seen to be also mounted between the headliner 26 and the outer roof surface 22, and preferably between the headliner 26 and the insulation 24. Moreover, the inflator 34 is also mounted between the two inflatable cushions 32 and 46 and preferably includes a second outlet 48 substantially similar in configuration to the first outlet 36, which is operatively coupled with a complementary inlet area or portion 50 of the cushion 46, which is substantially similar in configuration to the inlet portion 38 of the first cushion 32. Thus, the inflator 34 in the illustrated embodiment is configured and located for simultaneously delivering inflating gas to both of the cushions 32 and 46.

In the illustrated embodiment, a second inflator 54, substantially similar to the inflator 34, is also used. This second inflator 54 is also mounted between the insulation 24 and the headliner 26 and between the two inflatable cushions 32 and 46. Like the first inflator 34, the second inflator 54 has respective outlet portions 56 and 58 which are respectively coupled with complementary inlets 60 and 62 of the respective inflatable cushions 32 and 46. The second inflator 54 is also similar to the first inflator 34 in that it is responsive to a predetermined triggering signal for producing a quantity of inflating gas.

In this regard, a second group of impact sensors 64 are mounted in respective roof pillars 66 on the driver side of the vehicle 10 and are operatively coupled with the inflator 54 by suitable cables 68. Preferably, an additional interconnecting cable 70 operatively interconnects the respective inflators 34 and 54 and more particularly delivers the signals from the cables 44 of the sensors 40 to the second inflator 54, while at the same time delivering the signals from the cables 68 of the sensors 64 to the first inflators 34. Accordingly, this interconnecting cable 70 provides means for operatively linking the first and second inflator 34 and 54 for simultaneous response to the triggering impulses regardless of which of the sensors is impacted such that it produces such a triggering impulse.

In accordance with another aspect of the invention, the headliner 26 may be mounted relative to the roof 20 with sufficient slack to accommodate inflation of the inflatable cushions 32 and 46 to a predetermined increased thickness upon deployment thereof. Alternatively, the headliner may be constructed of an elastically expandable material so as to accommodate inflation of the inflatable cushions 32 and 46.

In a preferred embodiment, the inflated thickness of the inflatable cushion or cushions would preferably be at least two inches and preferably up to as much as four inches thick, depending upon the type of vehicle in which the system of the invention is installed. Preferably, the inflatable cushions 32 and 46 are constructed of a puncture-resistant material. Moreover, even if punctured, the cushions 32 and 46 are of sufficient volume, and the amount of inflating gas provided by the inflators 34 and 54 is sufficient to maintain the bags in an effectively inflated condition for an effective period of time following an impact sufficient to trigger the inflators.

The inflators 34 and 54 may be of a presently known type, however, we prefer to use a hybrid inflator of the type shown and described in U.S. Pat. No. 5,230,531, or alternatively, a $CO_2$ or other gas-filled cylinder with a hybrid type burst disk activation technology, for example, of the type shown and described in FIG. 4 of co-pending application Ser. No. 08/587,618, filed Jan. 17, 1996, which is commonly owned with this application.

While particular embodiments of the invention have been shown and described in detail, it will be obvious to those skilled in the art that changes and modifications of the present invention, in its various aspects, may be made without departing from the invention in its broader aspect, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The Invention is claimed as follows:

1. A passive vehicle occupant restraint system for an automotive vehicle having a front seat including a seat back defining generally a front passenger area to one side thereof and a rear passenger area to an opposite side thereof, an outer roof surface, a quantity of insulation material inside of said outer roof surface and a headliner covering said insulation material, said restraint system comprising: a first inflatable cushion mounted between said quantity of insulation material and said headliner and overlying at least a portion of the front passenger area of said vehicle: said inflatable cushion being inflatable to an increased thickness while still being retained between said quantity of insulation material and said headliner in such a manner as to provide a cushion, when inflated, between a head of a passenger and the outer roof surface, and an inflator operatively connected with said inflatable cushion and responsive to a predetermined triggering signal for producing a quantity of gas for inflating said cushion.

2. The system of claim 1 and further including a second inflatable cushion mounted between said quantity of insulation material and said headliner and overlying at least a portion of said rear passenger area; and wherein said inflator is further operatively coupled to said second inflatable cushion.

3. The system of claim 2 wherein said inflator is mounted between said headliner and said outer roof surface and generally between said first and second inflatable cushions.

4. The system of claim 2 and further including a second inflator operatively coupled with both of said inflatable cushions, and responsive to said predetermined triggering signal for producing a quantity of inflating gas.

5. The system of claim 4 and further including means operatively linking said first and second inflators for simultaneous response to said predetermined triggering signal.

6. The system of claim 4 wherein said second inflator is also mounted between said headliner and said outer roof surface and located generally between said first and second inflatable cushions in a side-by-side relation to said first inflator.

7. The system of claim 6 and further including roll-over sensor means operatively coupled to said first and second inflators and mounted to said vehicle in such a manner as to produce said predetermined triggering signal in response to a roll-over of said vehicle.

8. The system of claim 7 wherein said vehicle has a plurality of roof posts supporting said roof and wherein said roll-over sensor means comprise a plurality of roll-over sensors operatively coupled with first said and second inflators and respectively mounted on ones of said roof posts.

9. The system of claim 1 and further including roll-over sensor means operatively coupled with said inflator and mounted to said vehicle for producing said predetermined triggering signal in response to a roll-over of said vehicle.

10. The system of claim 9 wherein said vehicle has a plurality of roof posts supporting said roof and wherein said roll-over sensor means comprises a plurality of roll-over sensors, respectively mounted on ones of said roof posts.

11. The system of claim 1 wherein said inflatable cushion is fabricated of a puncture-resistant material.

12. A passive vehicle occupant restraint system for an automotive vehicle having a front seat including a seat back defining generally a front passenger area to one side thereof and a rear passenger area to an opposite side thereof, an outer roof surface, and a quantity of insulation material inside of said outer roof surface, said restraint system comprising: a headliner overlying said insulation material; a first inflatable cushion mounted between said quantity of insulation material and said headliner and overlying at least a portion of the front passenger area of said vehicle: said inflatable cushion being inflatable to an increased thickness while still being retained between said quantity of insulation material and said headliner in such a manner as to provide a cushion, when inflated, between a head of a passenger and the outer roof surface, and an inflator operatively connected with said inflatable cushion and responsive to a predetermined triggering signal for producing a quantity of gas for inflating said cushion.

13. The system of claim 12 wherein said headliner is elastically expandable to accommodate inflation of said inflatable cushion.

14. The system of claim 12 wherein said headliner is mounted relative to said roof with sufficient slack to accommodate inflation of said inflatable cushion.

15. A passive vehicle occupant restraint system for an automotive vehicle having a front seat including a seat back defining generally a front passenger area to one side thereof and a rear passenger area to an opposite side thereof, an outer roof surface, a quantity of insulation material inside of said outer roof surface and a headliner covering said insulation material, said restraint system comprising: a first inflatable cushion mounted between said quantity of insulation material and said headliner and overlying at least a portion of the front passenger area of said vehicle; an inflator operatively connected with said inflatable cushion and responsive to a predetermined triggering signal for producing a quantity of inflating gas for inflating said cushion; and roll-over sensor means operatively coupled with said inflator and mounted to said vehicle for producing said predetermined triggering signal in response to a roll-over of said vehicle, wherein said vehicle has a plurality of roof posts supporting said roof and wherein said roll-over sensor means comprises a plurality of roll-over sensors, respectively mounted on ones of said roof posts.

* * * * *